United States Patent

Inaki et al.

[11] Patent Number: 5,835,916
[45] Date of Patent: Nov. 10, 1998

[54] DOCUMENT PREPARING APPARATUS CAPABLE OF RELOCATING CELLS FORMING A TABLE AND RESETTING CELL SIZE

[75] Inventors: Yoshihiro Inaki, Gifu-ken; Yoshinori Hatayama, Ogaki; Satoshi Kurokawa, Hashima, all of Japan

[73] Assignee: Sanyo Electric Co., Ltd., Moriguchi, Japan

[21] Appl. No.: 601,851

[22] Filed: Feb. 15, 1996

[30] Foreign Application Priority Data

Feb. 24, 1995 [JP] Japan .................................. 7-037349

[51] Int. Cl.⁶ ................................................. G06T 3/00
[52] U.S. Cl. ................................................. 707/509
[58] Field of Search ..................... 395/761, 764, 395/765, 766–771; 345/333, 326, 335, 339, 340, 341, 342; 707/500, 503, 504, 505–510

[56] References Cited

U.S. PATENT DOCUMENTS 5,418,898   5/1995   Zand et al. ......................... 395/137

Primary Examiner—Almis R. Jankus
Attorney, Agent, or Firm—Armstrong, Westerman, Hattori, McLeland & Naughton

[57] ABSTRACT

A document preparing apparatus capable of independently relocating and/or resetting cells includes a text generator generating text, and tabulation device to form a table containing text. The table includes a plurality of cells for registering text data therein. The tabulation device includes a processing unit allowing an operator to designate a single cell in the table and to relocate the designated cell in an area of the table together with text data registered in the designated cell. In addition or alternatively, the processing unit can allow an operator to designate a single cell in the table and to reset a size of the designated cell.

15 Claims, 14 Drawing Sheets

Fig. 2

| x coordinate of start point (SX) | Y coordinate of start point (SY) | X coordinate of end point (EX) | Y coordinate of end point (EY) | type (T) |
|---|---|---|---|---|
| 1 | 1 | 18 | 20 | text |
| 21 | 1 | 40 | 20 | graphics |
| 1 | 25 | 40 | 45 | table |
| : | : | : | : | : |

| | | |
|---|---|---|
| RN | row number | 5 |
| CN | column number | 5 |
| RW | row width | 4 |
| CW | column width | 8 |
| F | font type | Mincho |
| S | character size | 24 |
| K | line type | solid line |
| H | screen type | plain |
| P | display position | left justify |
| | : | : |

| RNO row number | A attribute | D value |
|---|---|---|
| 1 | row width | 5 |
| 2 | line type | broken line |
| 4 | screen type | inverted |
| ⋮ | ⋮ | ⋮ |

| CNO column number | A attribute | D value |
|---|---|---|
| 2 | column width | 10 |
| 2 | font type | gothic |
| 2 | character size | 32 |
| 2 | display position | centering |
| ⋮ | ⋮ | ⋮ |

← CD

| row number (RNO) | column number (CNO) | attribute (A) | value (D) |
|---|---|---|---|
| 1 | 2 | data | address number |
| 3 | 4 | display position | centering |
| 4 | 2 | data | address number |
| 5 | 2 | horizontal width | 12 |
| ⋮ | ⋮ | ⋮ | ⋮ |
| 5 | 2 | position | coordinates |

SD

DOCUMENT PREPARING APPARATUS CAPABLE OF RELOCATING CELLS FORMING A TABLE AND RESETTING CELL SIZE

BACKGROUND OF THE INVENTION

1. Field of the Invention

The present invention relates generally to a document preparing apparatus with a tabulation function for making a table. More particularly, the invention relates to a document preparing apparatus capable of relocating cells which are elements of a table and resetting the cell sizes.

2. Description of the Related Art

Personal computers and word processors as information processing apparatuses (or document preparing apparatuses) generally have a tabulation function. The tabulation function allows an operator to form a table with lines using an input device and a display device. Text is registered in individual elements (cells) of the table which are arranged in rows and columns.

The tabulation function can relocate the table by the range specified by an operator using the input device. However, the conventional tabulation function cannot partially relocate a single cell or partially relocate a plurality of cells row by row or column by column. A row includes cells arranged in a horizontal direction and column includes cells arranged in a vertical direction. When an operator resets the horizontal width (or length) of individual cells on a column base by the "line shift", for example, the operator should adjust the position of text in the individual cells located on the associated line so that the text properly fits within the respective cells. Hence, a drawback of the conventional tabulation function is that the editing of a table using such a tabulation function is tiresome for operators.

When an operator resets the vertical width (or length) of individual cells on a row base or the horizontal width of individual cells on a column base, a spreadsheet program for displaying a table already having a plurality of cells recomputes the positions of the text in the individual cells so that the text properly fits in the respective cells. For example, when text has attribute information that specifies centering, the spreadsheet program recomputes the positions of the text so as to center the text in the cells following the resetting.

Further, the spreadsheet program manages the positional relation between cells by units of rows and columns, and thus can reset the cell size by units of rows and columns. This feature makes the table editing relatively easier. However, the spreadsheet program cannot reset the vertical width or horizontal width of a specific cell or relocate cells independently. Furthermore, it is difficult to put a table into a text document.

Windows, one type of operating system (OS), is designed to link application programs by an Object Linking Environment "OLE". Windows is capable of operating with a text preparing application program and a spreadsheet program. The OLE method can incorporate a table, which has been prepared by the spreadsheet program, into a text document prepared by the text preparing application program. However, to edit a table put in a text document, an operator should edit the table using the spreadsheet program and then perform some operations to incorporate the edited contents into the text document. Such an editing process is troublesome to operators. It is possible to edit a table incorporated in a text document using the text preparing application program. In this case, however, it is not possible to incorporate the edited contents of the table into the spreadsheet program. Further, the spreadsheet program operating on Windows cannot relocate cells independently or reset the cell sizes.

Japanese Unexamined Patent Publication No.3-206552 discloses a display processing system which outputs a text incorporating a table and/or a figure. At the time of editing a table so formed as to be linked between applications, this system does not need additional operations to incorporate the edited contents into the text. But, this system does not permit independent cell relocation or the resetting of the cell sizes. Tables used in the conventional system are not real table in which rows and columns are closely correlative to one another (e.g. spreadsheet or worksheet) but false tables in which independent cells are aggregated at random. Therefore, it is impossible, by using the conventional system, to perform calculations of table data and/or rearrangement of table by units of rows and columns.

SUMMARY OF THE INVENTION

Broadly speaking, the present invention relates to a document preparing apparatus capable of independently relocating and/or resetting cells. The present invention can be implemented in numerous ways.

A first embodiment of a document preparing apparatus according to the invention includes: a text generator for generating text; and tabulation means for forming a table containing text, the table having a plurality of cells for registering text data therein. The tabulation means includes a processing unit for allowing an operator to designate a single cell in the table and to relocate the designated cell in an area of the table together with text data registered in the designated cell.

A second embodiment of a document preparing apparatus according to the invention includes: a text generator for generating text; and tabulation means for forming a table containing text, the table having a plurality of cells. The tabulation means includes a processing unit for allowing an operator to designate a single cell in the table and to reset a size of the designated cell.

A third embodiment of a document preparing apparatus according to the invention includes: a display device for displaying on a screen thereof a table having a plurality of cells arranged in a matrix form having an plurality of rows and columns; an input device operable by an operator, for selecting or designating one of the cells displayed on the screen and for inputting a relocation position of the selected cell in order to change the position of the selected cell; and a processing unit for computing coordinates of a new outline of the selected cell in the relocation position based on original coordinates of the cell when selected and on data of the relocation position. The display device is controlled by the processing unit to display the new outline of the selected cell with its position changed on the screen.

A fourth embodiment of a document preparing apparatus according to the invention includes: a display device for displaying on a screen thereof a table having a plurality of cells arranged in a matrix form having a plurality number of rows and columns; an input device operable by an operator, for selecting or designating one of the cells displayed on the screen and for inputting a new size of the selected cell in order to change the size of the selected cell; and a processing unit for computing coordinates of a new outline of the selected cell with its size changed, based on original coordinates of the cell when selected and on data of the new size. The display device is controlled by the processing unit to display the new outline of the selected cell on the screen.

Other aspects and advantages of the invention will become more apparent from the following description taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

FIG. 2 is a structural diagram showing data stored in an element manager;

FIG. 3 is a structural diagram showing data stored in a table information manager;

FIG. 4 is a structural diagram showing data stored in a row information manager;

FIG. 5 is a structural diagram showing data stored in a column information manager;

DETAILED DESCRIPTION OF THE PREFERRED EMBODIMENTS

Figure 1:
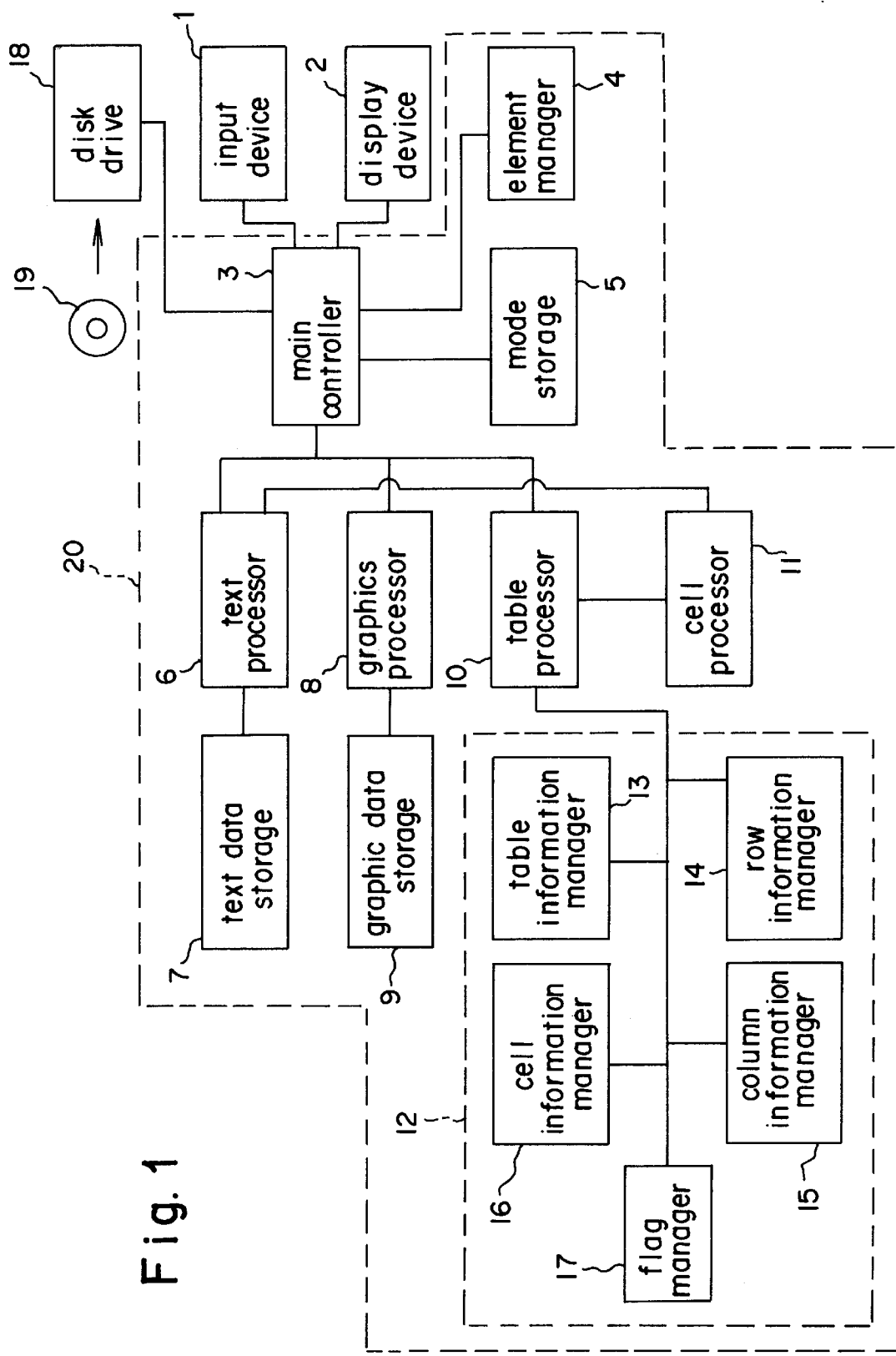
FIG. 1 is a block diagram showing a document preparing apparatus.

One embodiment of the present invention will be now described with reference to FIGS. 1 through 22. FIG. 1 is a functional block diagram showing a document preparing apparatus. As shown in FIG. 1, this apparatus comprises an input device 1, a processing unit 20 including a computer and executable computer programs, a display device 2 such as a CRT or a liquid crystal display device, and a disk drive 18 for reading data from a recording media such as a CD (compact disk) and a CD-ROM (compact disk-read only memory). The input device 1 and display device 2 are connected to the processing unit 20. The processing unit 20 includes a main controller 3, an element manager 4, a mode storage 5, a text processor 6, a text data storage 7, a graphics processor 8, a graphic data storage 9, a table processor 10, a cell processor 11 and a table data storage 12. The table data storage 12 includes a table information manager 13, a row information manager 14, a column information manager 15, a cell information manager 16 and a flag manager 17.

The input device 1 such as a keyboard and/or a mouse allows a computer operator to input text data, graphic data and table data, which includes characters and symbols, and to select various data editing functions. The input device 1 also allows the computer operator to select various edit modes like a document mode, a graphic mode and a table mode, and to specify various object areas (or ranges) like text, graphic and table objects.

The display device 2 displays on the screen what has been processed (text data, graphic data, table data, menus, etc.) by the processing unit 20 in accordance with the operator's manipulation of the input device 1.

The main controller 3 has a central processing unit (CPU) and storage devices such as a ROM (read only memory) having stored computer program data and a RAM (random access memory) for temporary storage of data. The main controller 3 controls the input device 1 and the display device 2 and allows the individual processors 6, 8 and 10 to control the system in accordance with the type of the object (text object, graphic object or table object) selected using the input device 1.

The disk drive 18 reads codes of a control program for preparing a document recorded on the recording media 19, and supplies the read codes to program code storing section (not shown) of the main controller 3. The document preparing control program is one of the above-mentioned executable computer programs. The processor 20 performs document preparation according to the document preparing control program.

The element manager 4 manages data SX, SY, EX and EY indicating a specified range for an object, and data T indicating the type of the object, such data is referred to as object management data OD and is shown in FIG. 2. The specified object range data SX, SY, EX and EY are represented by data on the coordinates for the start points X and Y and data on the coordinates for the end points X and Y.

The mode storage 5 stores an edit mode (document mode, graphic mode, table mode or the like) selected by the computer operator using the input device 1. The mode storage 5 further stores a priority mode designated by using the input device 1. The priority mode includes a priority-process mode for rows and a priority-process mode for columns.

The text processor 6 processes text data associated with each object in accordance with an instruction from the input device 1. The text data storage 7 stores text data and its attribute information, as well as text data incorporated in a figure or a table.

The graphics processor 8 processes graphic data associated with a graphic object in accordance with an instruction from the input device 1. The graphic data storage 9 stores graphic data including the type of a figure and an attribute.

The table processor 10 processes table data associated with a table object in accordance with an instruction from the input device 1. The cell processor 11 processes individual cells in a table in accordance with an instruction from the table processor 10. The table data storage 12 has a RAM (random access memory) and stores table data associated with a table object.

As shown in FIG. 3, the table information manager 13 stores and manages attribute information about the whole table as table management data HD. A table has a plurality of cells arranged in a matrix form consisting of rows and columns. A row includes cells arranged in a horizontal direction and column includes cells arranged in a vertical direction. The table management data HD includes data of values set by an operator and data of previously-set default values (or initial values). The set value data includes row number data RN indicating the number of rows in a table and column number data CN indicating the number of columns in the table. The default value data includes vertical width (or length) data RW of cell in each row (hereinafter called row width data), horizontal width (or length) data CW of cell in each column (hereinafter called column width data), font type data F, character size data S, line type data K, screen type data H and in-cell display position data P. As shown in FIG. 3, for example, default value data is:

row width: 4
column width: 8
font type: Mincho (one of the types of KANJI character)
character size: 24
line type: solid line
screen type: plain
display position: left justify.

This default value data can be set again by the operator.

The row information manager 14 stores and manages data of default values, row by row, which are associated with a row reset by the operator, as shown in FIG. 4. The row management data RD includes row number data RNO, attribute data A and attribute value data D. In the example shown in FIG. 4, the default value "4" for the row width RW of the first row is reset to "5", the default value "solid line" for the line type K for the second row is reset to "broken line", and the default value "plain" for the screen type H for the fourth row is reset to "inverted". The row information manager 14 also stores and manages input equations row by row.

The column information manager 15 stores and manages data of default values, column by column, which are associated with a column reset by the operator, as shown in FIG. 5. The column management data CD includes column number data CNO, attribute data A and attribute value data D. In the example shown in FIG. 5, the default value "8" for the column width CW of the second column is reset to "10", the default value "Mincho" for the font type F for the second column is reset to "Gothic", and the default value "24" for the character size S for the second column is reset to "32". The default value "left justify" for the display position data P of the second column is also reset to "centering". The column information manager 15 also manages input equations column by column.

Figures 6, 7:
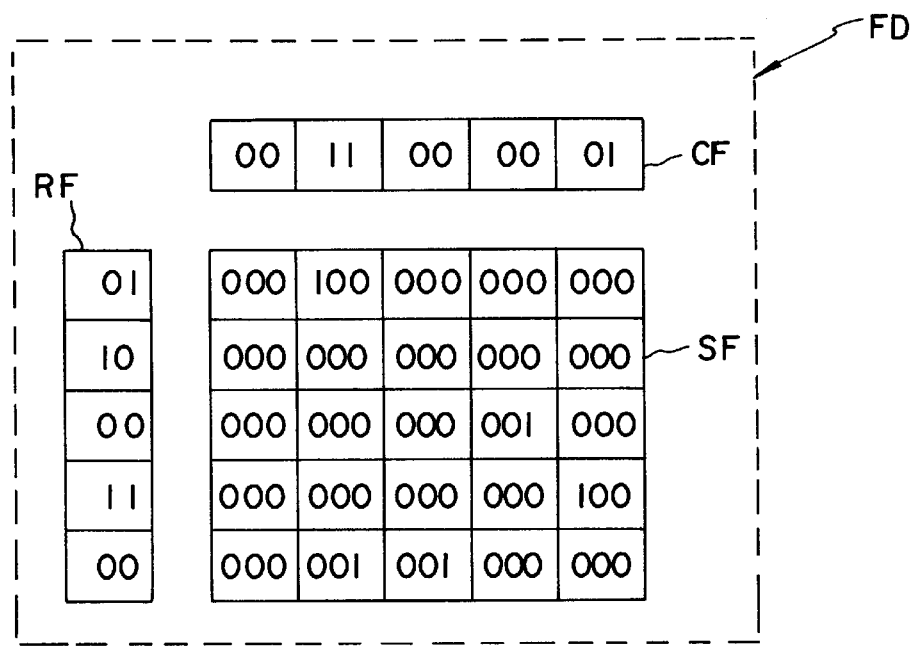
FIG. 6 is a structural diagram showing data stored in a cell information manager.
FIG. 7 is a structural diagram showing data stored in a flag manager.

The cell information manager 16 stores and manages the default value data, row management data RD and column management data CD as cell management data SD, cell by cell, which are managed by the table information manager 13, as shown in FIG. 6. The cell management data SD includes row number data RNO of a cell, column number data CNO of a cell, attribute data A and attribute value data D. In the example shown in FIG. 6, the default value "left justify" for the display position P defined by row and column numbers (3, 4) is reset to "centering", and the default value "8" for the column width defined by row and column numbers (5, 2) is reset to "12". The cell information manager 16 also manages data associated with text data registered in cells in a table. In the example shown in FIG. 6, "data" is registered as the attribute data A of each cell defined by the row and column numbers (1, 2) and (4, 2) and "address number" is registered as the attribute value data D. The "address number" indicates the address number in the text data storage 7 which stores that text data.

As shown in FIG. 7, the flag manager 17 stores and manages flag management data FD. This flag management data FD includes row information flags RF, column information flags CF and cell information flags SF. The row information flags RF prepared correspond in quantity to the row number RN, and indicate whether or not to reset the positional information including a row width and the attribute information of text data including a font type. The column information flags CF prepared correspond in quantity to the column number CN, and indicate whether or not to reset the positional information including a column width and the attribute information. Each of the row information flags RF and column information flags CF consists of a lower bit indicating whether or not to reset positional information and an upper bit indicating whether or not to reset attribute information. Thus, the row information flag RF and column information flag CF are "00" when the position and attribute are not reset, are "01" when the position alone is reset, are "10" when the attribute alone is reset, and are "11" when both the position and attribute are reset.

The number of the cell information flags SF prepared corresponds to the number of cells (RN×CN), and the cell information flags SF indicate whether or not to reset the positional information including the row width and column width and the attribute information of text data, cell by cell, and also indicate whether or not to register text data in cells. Each cell information flag SF consists of a lower bit indicating whether or not to reset positional information, a middle bit indicating whether or not to reset attribute information, and an upper bit indicating whether or not to register the text data. When there is the registration of text data without resetting the position and attribute, for example, the cell information flag SF becomes "100".

Figure 8:
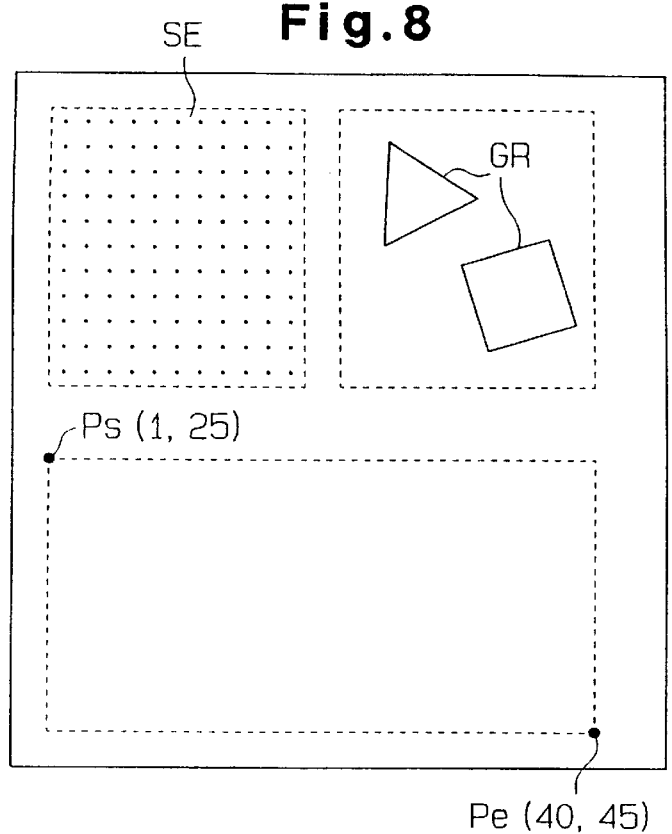
FIG. 8 is a diagram showing a table forming range being specified.

The operation of the document preparing apparatus according to the invention will be now described. As shown in FIG. 8, for example, a computer operator selects the "document mode" using the input device 1 and designates an area (indicated by a broken line in the diagram) for preparing a document by dragging a mouse. Accordingly, the operator can prepare a document SE in the specified area. Further, the operator selects the "graphic mode" and then designates an area (also indicated by a broken line) for creating a figure. Accordingly, the operator can prepare a figure GR in the specified area. It is assumed that after the preparation of the document SE and figure GR, the operator selects the "table mode".

Table Display on Screen

Figure 10:
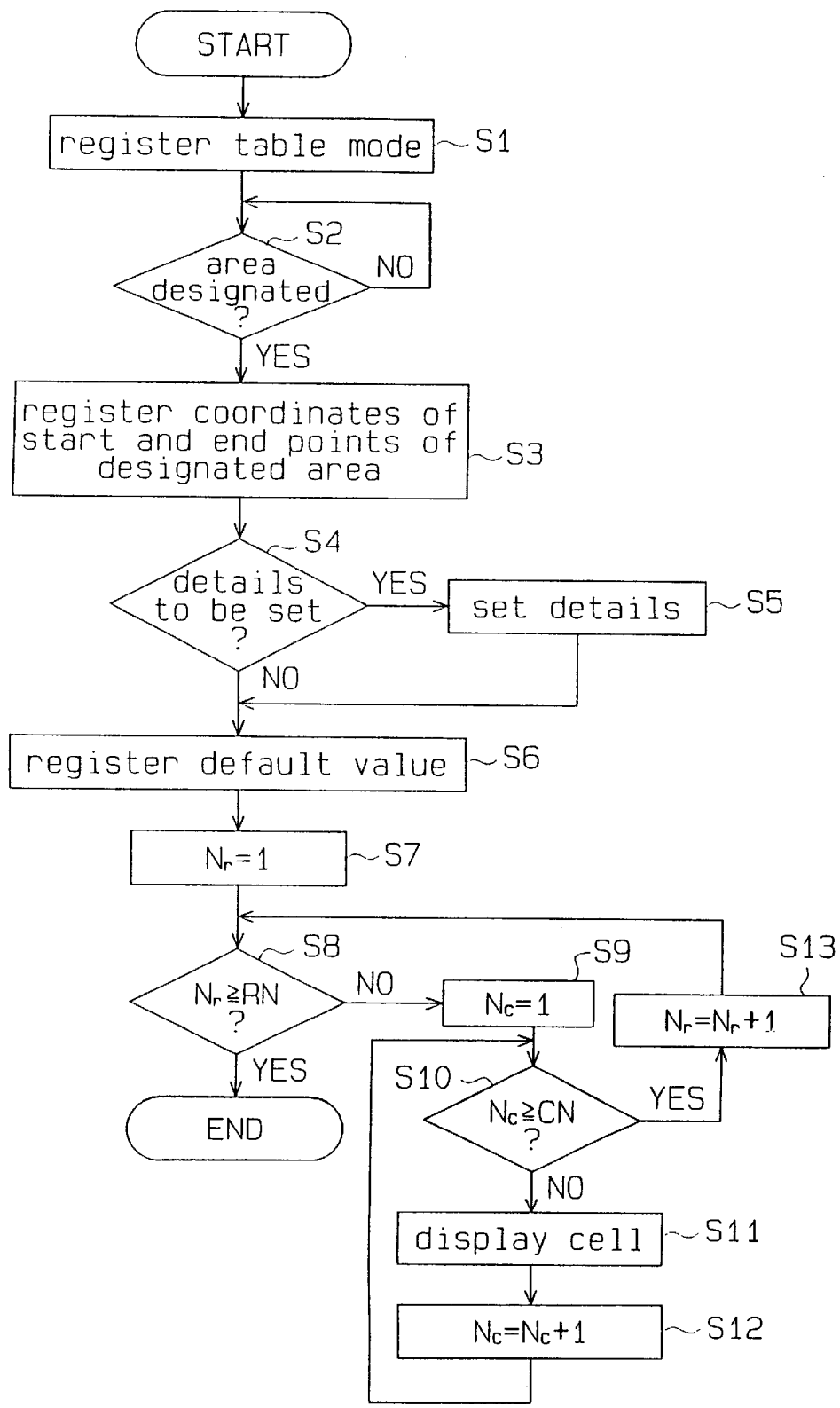
FIG. 10 is a flowchart illustrating a table displaying process.

FIG. 10 presents a flowchart illustrating procedures of displaying a table after the selection of the "table mode". In step S1, the main controller 3 stores the "table mode" in the mode storage 5. Then, the operator points on an upper left point Ps by depressing a mouse button, moves the mouse and then releases the mouse button at a lower right point Pe, as shown in FIG. 8. As a result, the main controller 3 identifies the table preparing area (step S2). In step S3, the main controller 3 computes the coordinates (1, 25) of the pointed start point Ps and the coordinates (40, 45) of the end point Pe where the mouse has been released. Then, the main controller 3 registers such coordinate data together with the type data T "table" of the object in the element manager 4.

In the next step S4, the main controller 3 displays "detailed table setting YES/NO?" on the screen of the display device 2. When the operator selects "YES", the main controller 3 temporarily stores set information in step S5 after which the controller 3 proceeds to step S6. The set information includes set value data of the row number RN and column number CN, set by the operator, and/or default value data such as the row width RW and column width CW, reset by the operator. At this time, the default values of the row width RW and column width CW can be set again, row by row and column by column. On the other hand, when the operator selects "NO" in step S4, the flow proceeds directly to step S6. The main controller 3 allows the table processor 10 to control the system using the coordinate data of the start point and end point, and/or set information.

In step S6, the table processor 10 activates the individual sections included in the table data storage 12. The table information manager 13 registers preset default value data, and also registers set information when receiving such. When receiving no set information, the table information manager 13 computes the optimal values for the row number RN and column number CN for the specified table range based on the preset default values of the row width and column width. The thus computed values of the row number RN and column number CN are registered as set value data in the table information manager 13.

When the operator resets the row width row by row, for example, the following process is executed to minimize the amount of data about the default value for the row width to be reset. The table processor 10 compares the number of rows whose row widths are reset to the same value by the operator, with the number of rows having the preset default value for the row width, and identifies the value of the row width of the rows whose number is greater, as the default value. When the number of rows with the preset default value of "4" for the row width is greater than the number of rows reset to the same row width "5", for example, the value "4" is identified as the default value. To memorize that the rows having the row width of "5" differs from those having the default value of "4", the table processor 10 sets "1" to the lower bits of the row flags RF in the flag management data FD, which correspond to the associated rows. As shown in FIG. 4, the default value data about the rows reset by the operator is registered as the row management data RD in the row information manager 14. The same processing as done for the row width is executed when the operator resets the column widths column by column.

Figure 9:
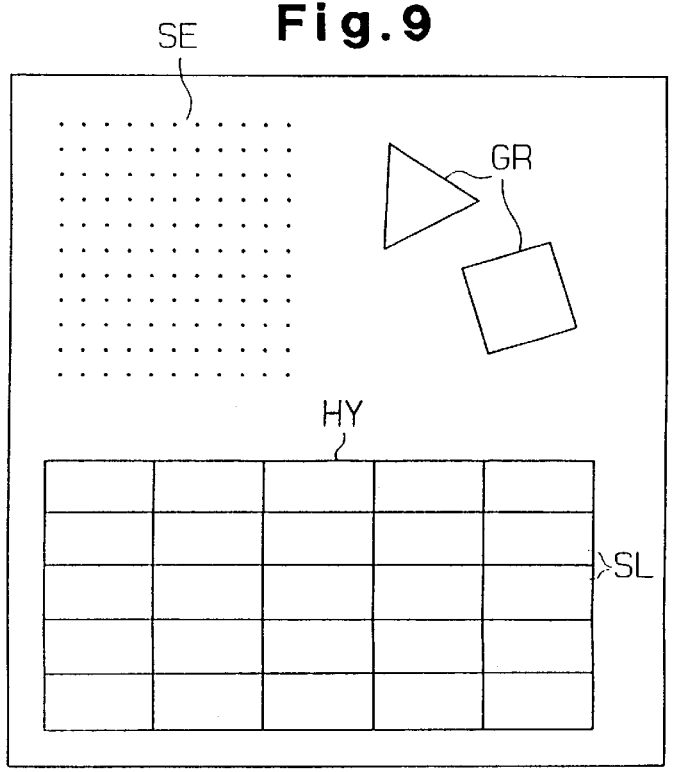
FIG. 9 is a diagram showing a table being displayed.

In steps S7 to S13, to display a table HY as shown in FIG. 9, for example, the table processor 10 displays the cells from the one having the row and column numbers (1, 1) to the one having the row and column numbers (RN, CN) row by row on the screen of the display device 2. The details of the table display procedures will be described below.

In step S7, the table processor 10 initializes the row number Nr of cells to Nr=1. In step S8, to determine if the display of all the cells from the one having the row number Nr=1 to the one having the row number Nr=RN has been completed, the current row number Nr is compared with the last row number RN. When the current row number Nr does not match with the last row number RN, the sequence of processes from step S9 to step S13 is repeated. In step S9, the column number Nc is initialized to Nc=1. In step S10, to determine if the display of all the cells from the one having the column number Nc=1 to the one having the column number Nc=CN has been completed, the current column number Nc is compared with the last column number CN. While the current column number Nc does not coincide with the last column number CN, the processes in steps S11 and S12 are repeated. In step S11, the cell with the current row number (Nr, Nc) is displayed. Next, "1" is added to the current column number Nc (i.e., Nc=Nc+1) in step S12.

When RN=5 and CN=5, for example, the processes in steps S10 to S12 are repeated for Nr=1 so that five cells in the first row are displayed. When the matching of the current column number Nc=5 with the last column number CN=5 is detected, the row number Nr=2 is acquired in step S13. Then, repeating the processes in steps S10 to S12 again causes five cells in the second row to be displayed. Thereafter, as the processes in steps S8 to S13 are repeated, the individual cells in the third to fifth rows are sequentially displayed. When the display of the cells in the fifth row is completed, it is detected in step S8 that the current row number Nr=5 with the last row number RN=5, as a result of which the process of displaying the table HY is terminated.

In step S11, the table processor 10 computes the display position of the cell with the current row and column numbers (start point and end point) based on the current row and column numbers (Nr, Nc) and the table management data HD. When the value of the row width or the column width of the displayed cell is reset by the operator at this time, the reset value for the row width or the column width is used in accordance with the priority mode ("row priority" or "column priority") registered in the mode storage 5. Then, the table processor 10 allows the cell processor 11 to control the system using the cell display position and the table management data. The cell processor 11 requests the main controller 3 to display a cell. In response to the request, the main controller 3 displays a cell of a predetermined size at the given position on the screen of the display device 2.

When text data to be displayed is present in the cells at the time of displaying a table previously prepared by the operator, the following processing is executed in step S11. After computing the display positions of the cells, the table processor 10 checks if text data should be registered based on the flag management data FG shown in FIG. 7. At this time, the upper bit of the cell information flag SF corresponding to the current row number is checked. When "1" is set to the upper bit, the table processor 10 acquires the address number for the text data corresponding to the current row and column numbers from the cell management data SD shown in FIG. 6.

Next, it is checked from the flag management data FD whether or not the attribute of the text data is to be reset. At this time, the middle bit of the cell information flag SF is checked with the top priority, after which the upper bit of the row information flag RF or that of the column information flag CF is checked in accordance with the priority mode. When "1" is set to the middle bit of the flag SF, the table processor 10 acquires attribute information of the text data corresponding to the current row and column numbers from the cell management data SD. When "1" is set to the upper bit of the flag RF or CF, the table processor 10 acquires attribute information of the text data corresponding to the current row and column numbers from the row management data RD or column management data CD. When "1" is not set, the table processor 10 acquires the default value for the attribute of text data as attribute information from the table management data HD shown in FIG. 3. Then, the table processor 10 allows the text processor 6 to control the system using the address number and attribute information. The text processor 6 requests the main controller 3 to display text data. In response to the request, the main controller 3 displays text data in a cell in accordance with the address number and attribute information.

Whether to enable or disable the resetting of the row width or column width is detected by checking the positional information of the flag management data FD by the same scheme as employed for the attribute of text data. The value of the reset row width and column width is acquired by the priority order of the cell management data SD, the row management data RD or the column management data CD.

Input of Text Data into Cell

Figure 13:
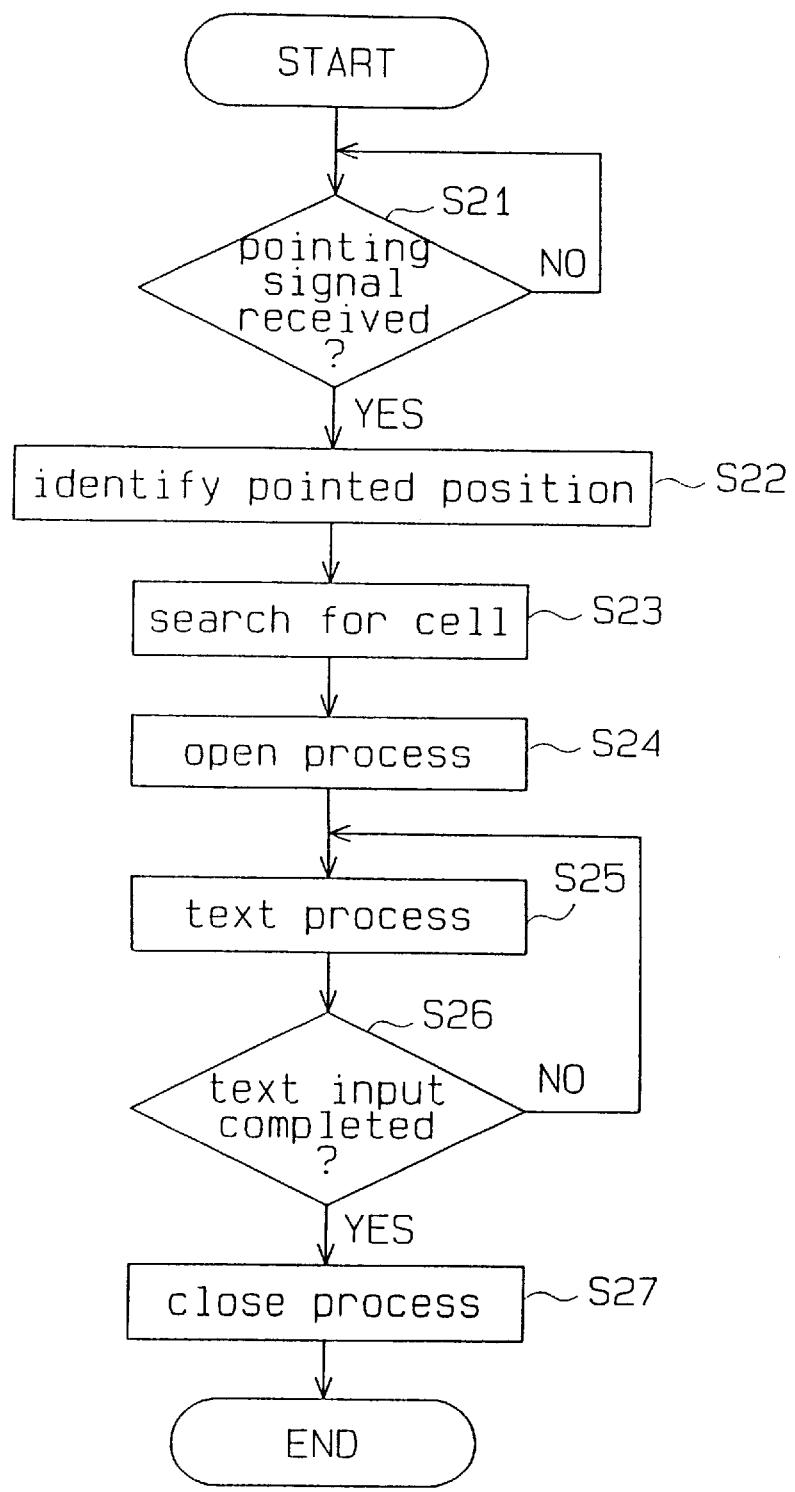
FIG. 13 is a flowchart illustrating procedures of inputting text into a cell.

FIG. 13 presents a flowchart illustrating the process of inputting text data into each cell in the table HY. To designate one of the cells where text data is to be entered, the operator points to the cell with the mouse button. In step S21, when receiving a pointing signal from the mouse, the main controller 3 determines that a cell has been designated. When there is the designation of a cell, the main controller 3 acquires the coordinates (X1, Y1) of the pointed position in step S22, and checks the type data T of the object to which the coordinates belong based on the object management data OD shown in FIG. 2. When the coordinates of the pointed position belong to the type data T "table", it is detected that the coordinates are present in the table designated area. Then, the main controller 3 allows the table processor 10 to control the system using the coordinate data (X1, Y1).

Figure 11:
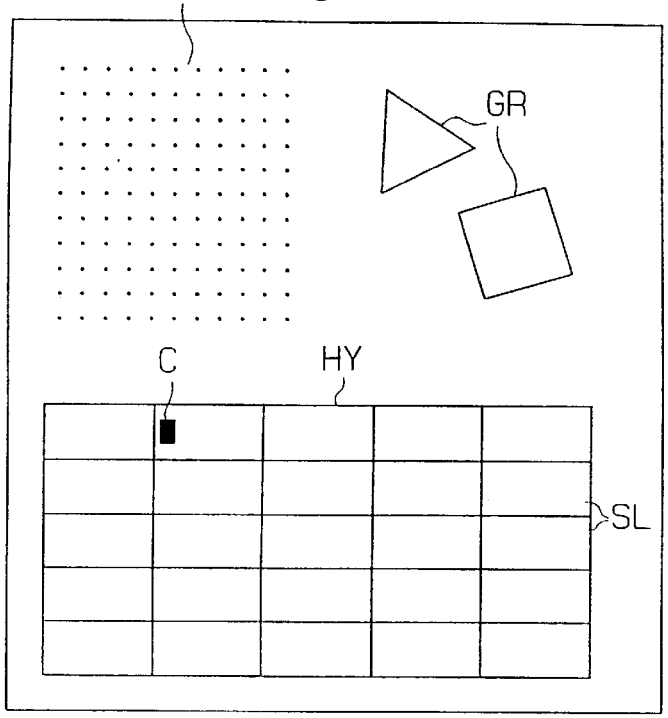
FIG. 11 is a diagram showing a cursor shown in a cell.

The table processor 10 searches the table data storage 12 for the cell associated with the coordinate data (X1, Y1) in step S23, and executes an "open process" in step S24. In the open process, the table processor 10 permits the text processor 6 to control the system using the positional information and attribute information. As shown in FIG. 11, the text processor 6 displays in the cell a cursor C indicating the position where text data is to be input.

Figure 12:
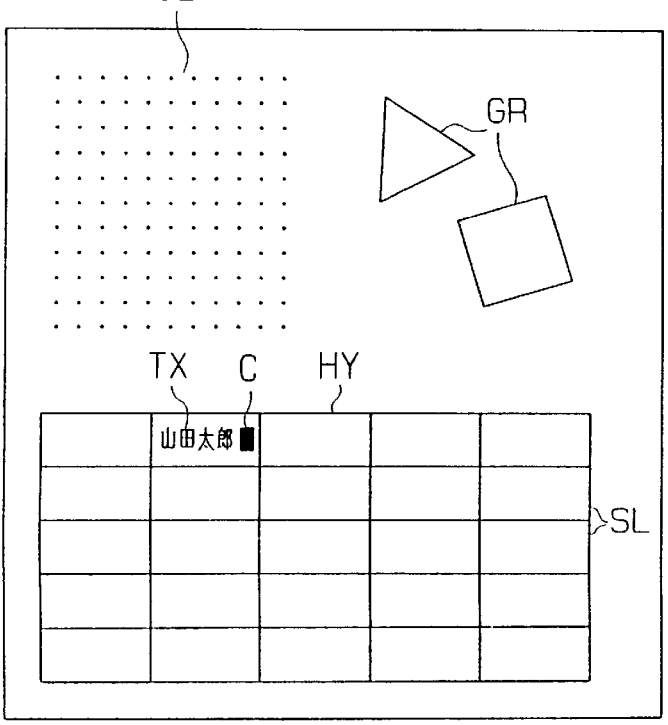
FIG. 12 is a diagram showing text put in a cell.

When the operator manipulates the keyboard to enter a text (string of characters), the text processor 6 executes a text process in step S25. The text process displays the text data TX, sent from the keyboard, into the cell as shown in FIG. 12 in step S25.

When the operator manipulates the mouse to perform an operation to indicate the completion of the text input, the text processor 6 detects that the text input has been completed based on the operation signal in step S26. Subsequently, the text processor 6 stores the text data TX at a new address number in the text data storage 7 and performs a "close process" in step S27. In the close process, the text processor 6 permits the table processor 10 to control the system using the address number for the text data. To register information indicative of the inputting of text data in the flag management data FD, the table processor 10 sets "1" to the upper bit of the cell information flag SF associated with the cell having, for example, the row and column numbers (1, 2), as shown in FIG. 7. The table processor 10 further adds the row and column numbers (1, 2), attribute A "data" and attribute value D "address number" to the cell management data SD, as shown in FIG. 6.

Resetting of Column Width of Table

Figure 14:
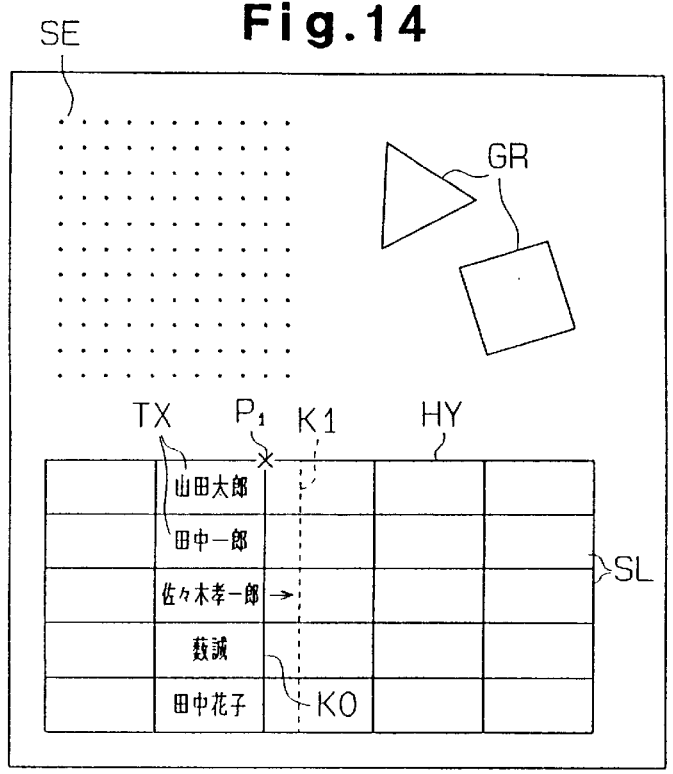
FIG. 14 is a diagram showing that the resetting of a cell horizontal width on a column base is specified.
Figure 16:
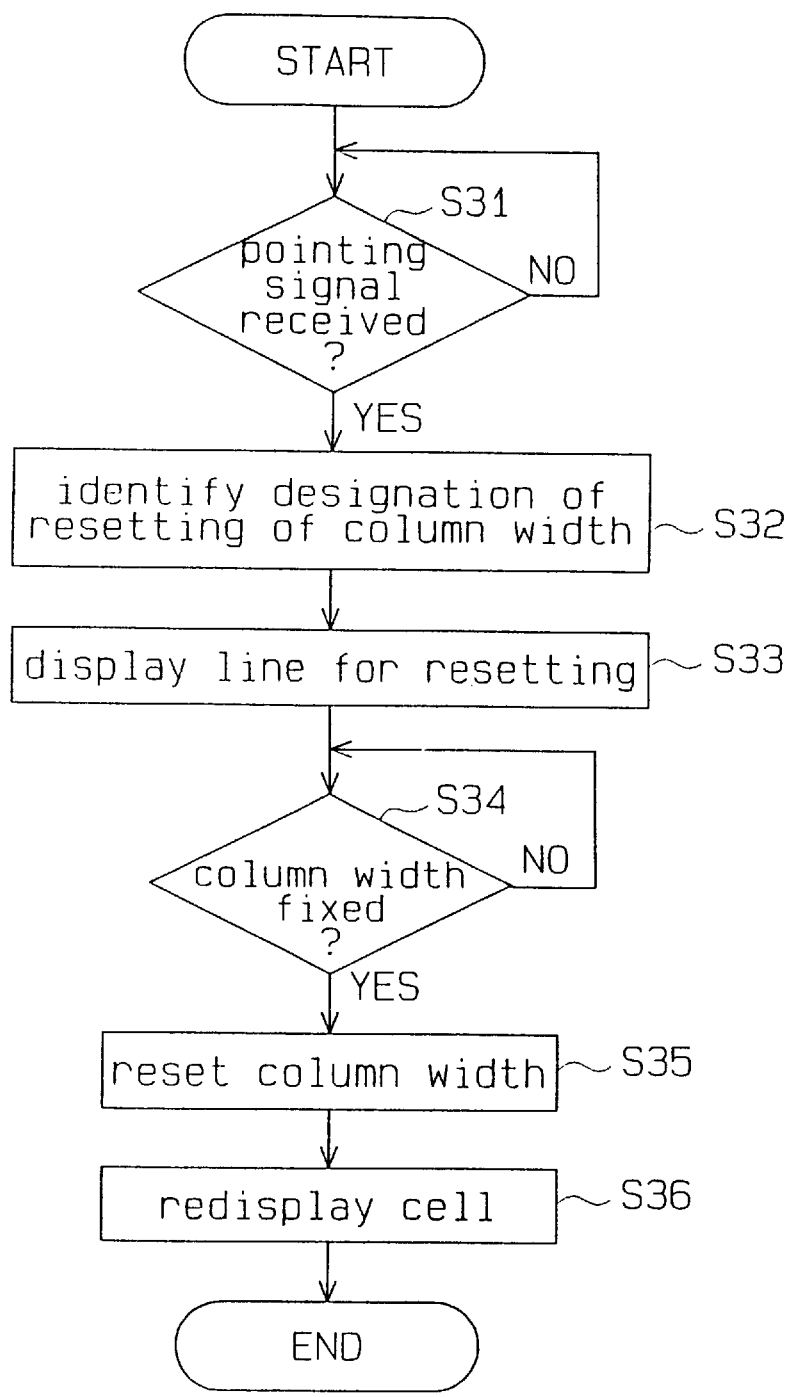
FIG. 16 is a flowchart illustrating procedures of resetting a cell horizontal width on a column base.

FIG. 16 presents a flowchart illustrating procedures of resetting the column width of a table. A description will be now given of the case where the column width of the second column in the table HY is to be reset as shown in FIG. 14. It is assumed that text data TX has been previously registered and centered in each cell of the second column.

To designate the cell column whose column width is to be reset, the operator presses the mouse button to point to the topmost portion P1 of the right vertical line K0 common to all the cells in the second column. When receiving the pointing signal from the mouse in step S31, the main controller 3 determines whether or not the coordinates (X2, Y2) of the pointed position lie in the table area. When those coordinates lie in the table area, the main controller 3 allows the table processor 10 to control the system using the positional coordinate data (X2, Y2). In step S32, the table processor 10 determines if the coordinates (X2, Y2) lie on the vertical line K0. When it is determined that those coordinates lie on the vertical line K0, the table processor 10 recognizes that the operator has designated the resetting of the column width.

In step S33, the table processor 10 displays a line K1 for resetting the width on the screen in such a way that the line K1 overlies the line K0 and becomes brighter than the other lines (or has a different color tone). This line K1 can move in the right and left direction by the operator dragging the mouse.

When the operator shifts the line K1 rightward and then releases the mouse button, for example, in step S34, the table processor 10 detects that the column width has been fixed. Then, the table processor 10 acquires the positional coordinates of the resulting destination of the line K1 from the mouse and computes the reset column width based on the coordinates in step S35. To register information associated with the resetting of the computed column width, the table processor 10 sets "1" to the lower bit of the column information flag CF in the second column, as shown in FIG. 7. Further, the table processor 10 adds the column number "2", the attribute "column width" and attribute value "10" to the column management data CD, as shown in FIG. 5. If data about the column width of the second column is already present in the column management data CD, only the attribute value is changed. When the resetting of the column width is finished, the table processor 10 allows the cell processor 11 to control the system.

Figure 15:
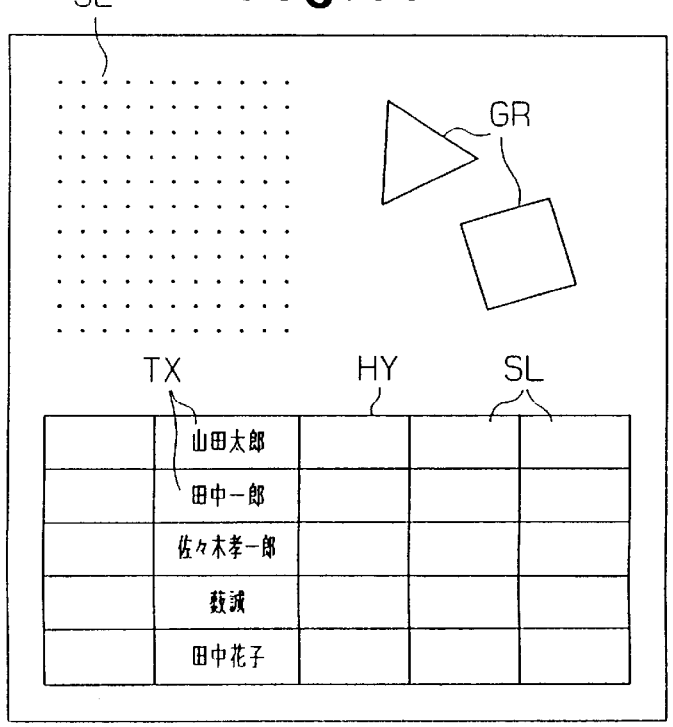
FIG. 15 is a diagram showing the cell horizontal width being reset on a column base.

To redisplay the cells of the second and subsequent columns according to the reset column width in step S36, the cell processor 11 performs steps S7 to S13 in the flowchart in FIG. 10. In step S9, Nc is initialized to "2". As shown in FIG. 15, the redisplay is executed in such a manner that the individual cells of the second column have a wide column width ("10" in this case) and the individual cells of the third and subsequent columns are shifted rightward while keeping the previous column width. The text data TX registered in each cell of the second column is displayed (centered) in accordance with the attribute information. As is apparent from the above, the resetting of the row width or the resetting of attribute information row by row or column by column is carried out in the same procedures as taken in the above-described resetting of the column width.

Relocation of Cells

Figure 17:
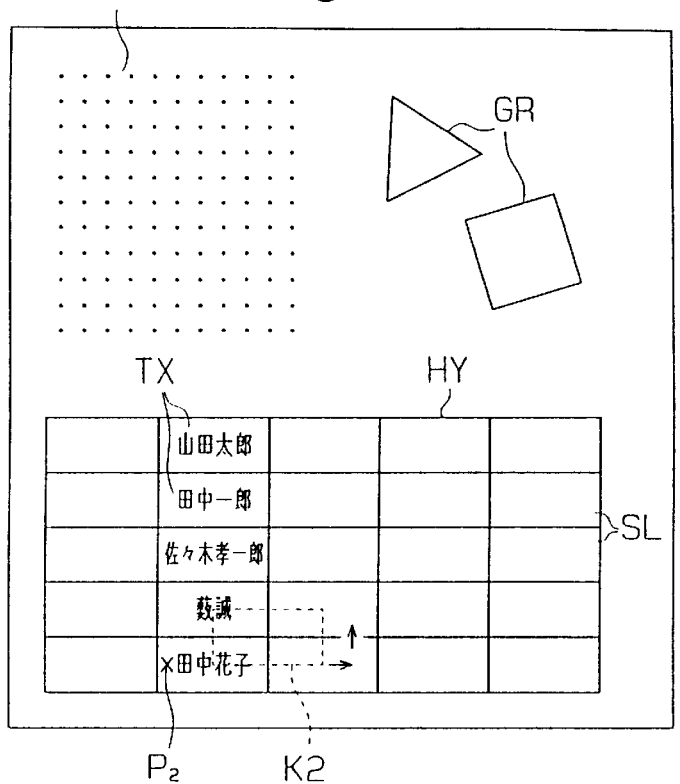
FIG. 17 is a diagram showing that the relocation of a cell is specified.
Figure 19:
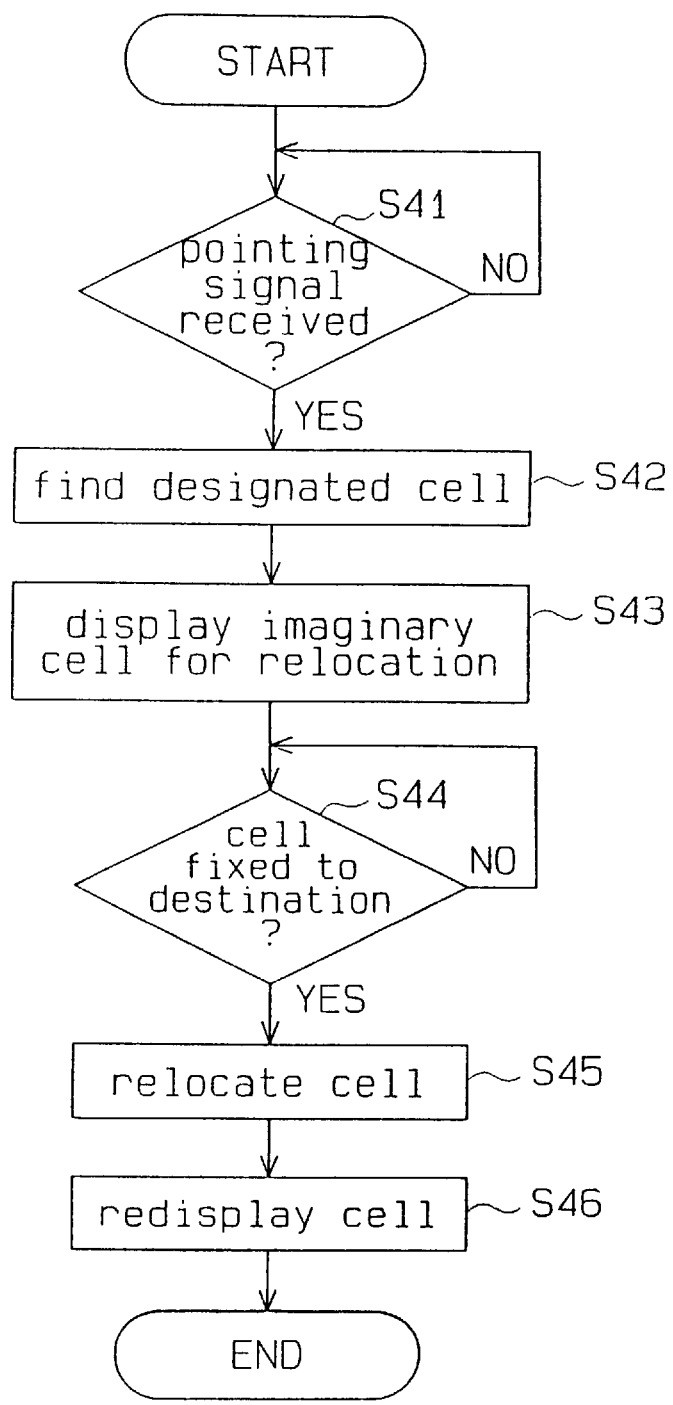
FIG. 19 is a flowchart illustrating a cell relocating process.

FIG. 19 is a flowchart illustrating a cell relocating process. A description will be now given of the case where a cell SL at the fifth row and the second column in the table HY is to be relocated as shown in FIG. 17. It is assumed that text data TX is previously registered (centered) in the individual cells of the second column. After selecting the "table mode", the computer operator selects the "cell relocation" from a menu displayed on the screen. To designate a cell to be relocated, the operator then depresses the mouse button to point to inside the cell SL (shown by a point P2). When obtaining the pointing signal from the mouse, the main controller 3 determines if the coordinates (X3, Y3) of the pointed position lie within the table area in step S41. When the coordinates lie within the table area, the main controller 3 allows the table processor 10 to control the system using the positional coordinate data (X3, Y3).

In step S42, the table processor 10 finds out the cell SL designated by the operator, through the computation based on the positional coordinates (X3, Y3), and identifies this cell SL as the one to be relocated. In step S43, the table processor 10 displays an imaginary cell K2 for relocation, indicated by rectangular lines, on the screen in such a way that the imaginary cell K2 overlies the cell SL and becomes brighter than the lines that form the other cells (or has a different color tone). This imaginary cell K2 can move horizontally and vertically by the operator dragging the mouse.

When the operator shifts the imaginary cell K2 and to the right and releases the mouse button, for example, the table processor 10 identifies that the cell SL has been fixed to the destination in step S44. In step S45, the table processor 10 then performs the cell relocation. In this processing, the positional coordinates of the imaginary cell K2 at the destination are obtained from the mouse and the coordinates (start point and end point) of the relocated cell SL are computed based on the obtained coordinates of the imaginary cell K2. To register information concerning the relocation of the cell SL, the table processor 10 sets "1" to the lower bit of the cell information flag SF for the row and column numbers (5, 2) as shown in FIG. 7. Further, the row and column numbers (5, 2), attribute "position" and the values "coordinates (start point and end point) of the destination" are added to the cell management data SD as shown in FIG. 6. When data associated with the relocation of the cell having the row and column numbers (5, 2) is already present in the cell management data SD, only the coordinate values are changed. When the relocation of the cell is finished, the table processor 10 allows the cell processor 11 to control the system. In this manner, a single cell in a table incorporated in a document can be relocated independently without affecting the other cells.

Figure 18:
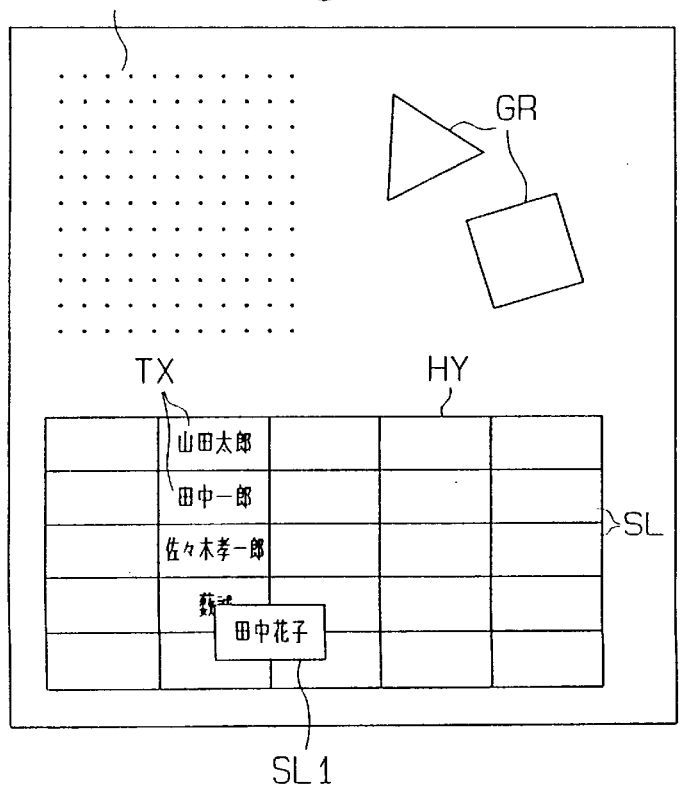
FIG. 18 is a diagram showing a cell being relocated.

To display the relocated cell SL at the position of relocation in step S46, the cell processor 11 executes steps S7 to S13 in the flowchart in FIG. 10. At this time, Nr is initialized to "5" in step S7 and Nc is initialized to "2" in step S9. Further, the row number is set to RN=5 in step S8 and the column number is set to CN=2 in step S9. When identifying that the lower bit of the cell information flag SF for the row and column numbers (5, 2) is "1", the cell processor 11 acquires information about the relocation of the cell having the row and column numbers (5, 2) from the cell management data SD. As shown in FIG. 18, the cell processor 11 displays a cell SL1 based on the coordinates (start point and end point) at the destination and displays text data TX in the center of the cell SL1 based on the attribute information. At this time, the cell SL1 after relocation is displayed so as to overlie the cell SL before the relocation.

As discussed above, it is possible to automatically display text data in the relocated cell in the center or set the text data to the same font as the one used before the relocation. A cell can be freely relocated without correcting the attribute information of text data to be displayed in that cell. Further, it is possible to improve the speed of the process to acquire the attribute information necessary for displaying the relocated cell. The display of the cell SL1 after relocation to overlie the cell SL before the relocation allows for the preparation of a document incorporated with a visually variable table.

Resetting of Cell Size

Figure 20:
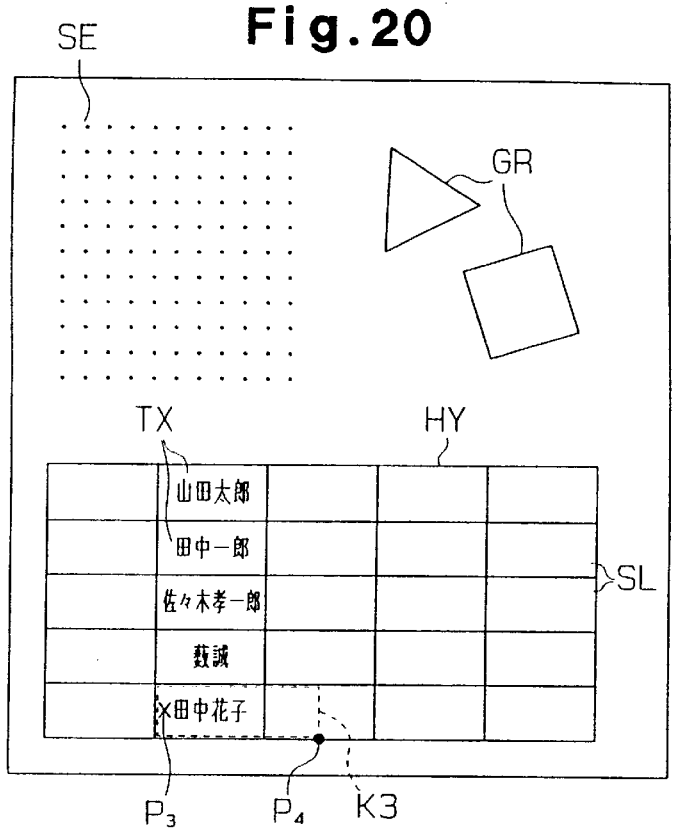
FIG. 20 is a diagram showing that the resetting of a cell horizontal width is specified.
Figure 22:
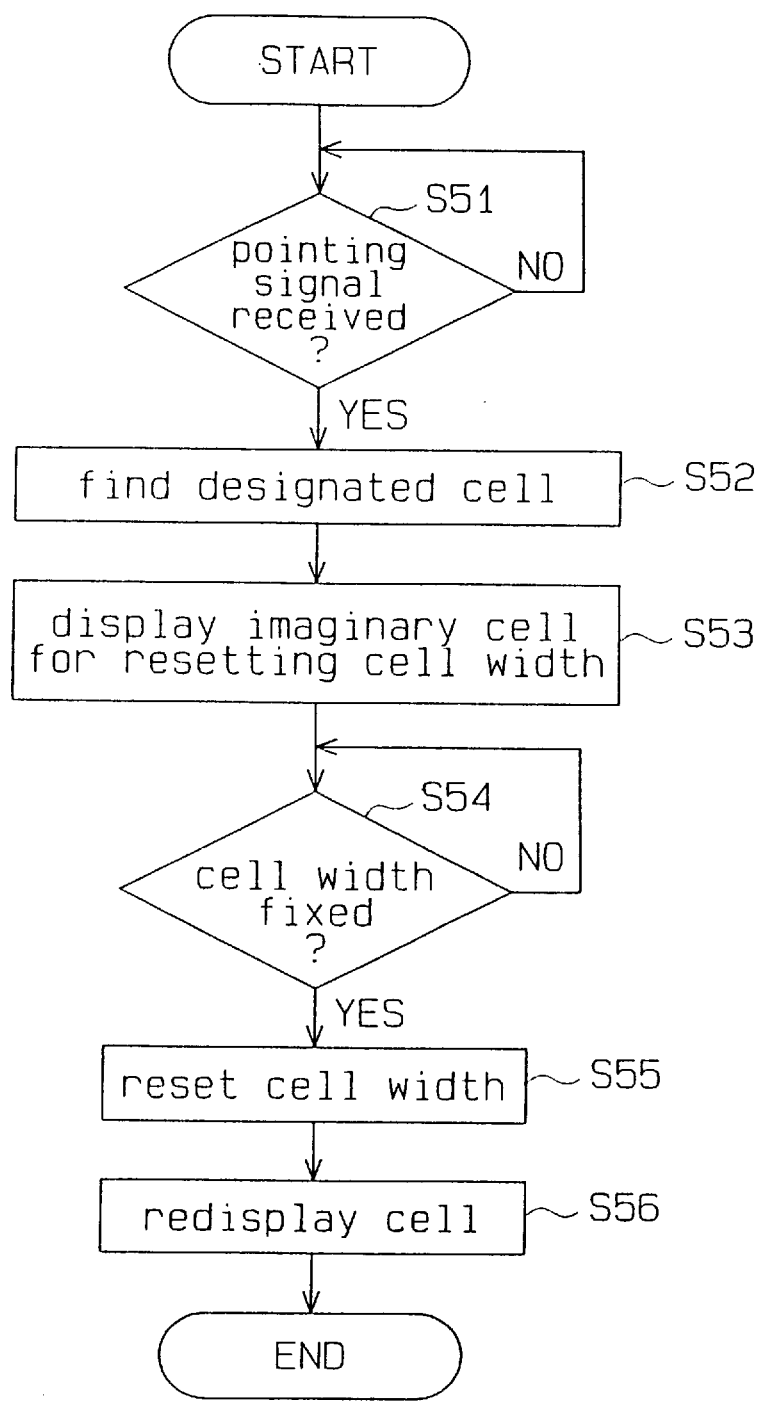
FIG. 22 is a flowchart illustrating procedures of resetting a cell horizontal width.

FIG. 22 presents a flowchart illustrating the process of resetting the cell size. A description will be now given of the case where the horizontal width of the cell SL at the fifth row and the second column is reset as shown in FIG. 20. After selecting the "table model", the computer operator selects the "resetting width" from a menu. To designate a cell whose horizontal width is to be reset, the operator depresses the mouse button to point to inside the cell SL (shown by a point P3). In step S51 as in step S41, the main controller 3 determines if the coordinates (X4, Y4) of the pointed position lie within the table area. When the coordinates lie within the table area, the main controller 3 allows the table processor 10 to control the system using the positional coordinate data (X4, Y4).

In step S52 like in step S42, the table processor 10 finds out the cell SL designated by the operator and identifies this cell SL as the one whose width is to be reset. In step S53 as in step S43, the table processor 10 displays an imaginary cell K3 for resetting the width, indicated by rectangular lines, on the screen in FIG. 20. At this time, the upper left point as the start point of the imaginary cell K3 is fixed and the lower right point as the end point is movable horizontally and vertically together with the right vertical line and lower horizontal line, which form the imaginary cell K3. Not only the lower right point but also the remaining three points (upper right point, upper left point and lower left point) may be made movable. This design can improve the degree of freedom in resetting the cell size. Further, by moving all the four points of a cell, this cell can be relocated.

When the operator shifts the lower right point of the imaginary cell K3 rightward to widen the horizontal width of that cell K3 and releases the mouse button at the position indicated by a point P4, for example, the table processor 10 identifies that the horizontal width of the cell SL has been fixed in step S54. After the table processor 10 acquires the coordinates of the point P4 in step S54, the processor 10 performs a process of resetting the cell width in step S55. In this processing, the horizontal width of the cell having the point P4 as the end point is computed. To register information concerning the resetting of the cell width, the table processor 10 sets "1" to the lower bit of the cell information flag SF for the row and column numbers (5, 2), and adds the row and column numbers (5, 2), attribute "horizontal width" and the value "12" to the cell management data SD as shown in FIG. 6. When data associated with the resetting of the width of the cell having the row and column numbers (5, 2) is already present in the cell management data SD, only the value of the horizontal width is changed. When the resetting of the cell width is finished, the table processor 10 allows the cell processor 11 to control the system. In this manner, the cell size of a single cell in a table incorporated in a document can be reset independently without affecting the other cells.

Figure 21:
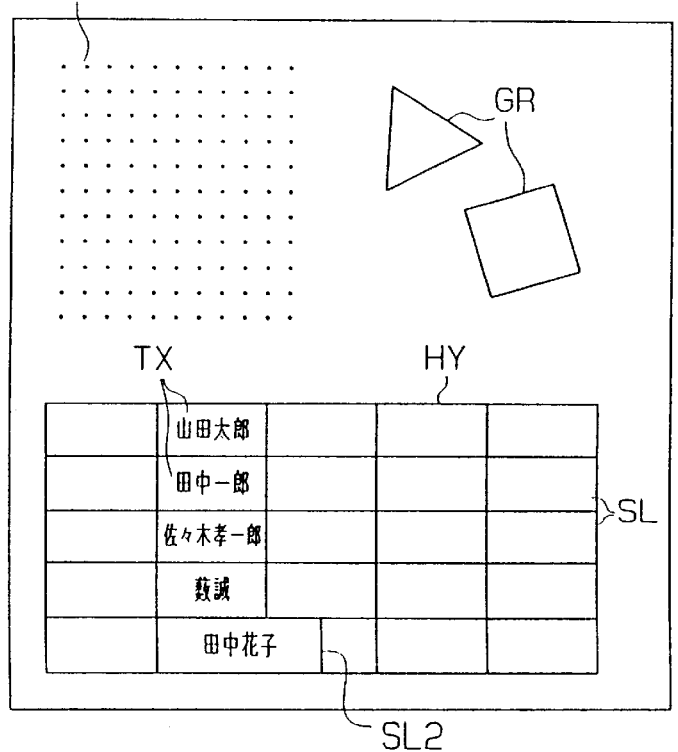
FIG. 21 is a diagram showing the cell horizontal width being reset.

To redisplay the cell whose horizontal width has been reset in step S56, the same process as in step S46 is performed. At this time, when identifying that the lower bit of the cell information flag SF for the row and column numbers (5, 2) is "1", the cell processor 11 acquires information about the resetting of the size of the cell having the row and column numbers (5, 2) from the cell management data SD. As shown in FIG. 21, the cell processor 11 displays the cell of the row and column numbers (5, 2) whose horizontal width has a reset value of "12" and displays text data TX in the center in a cell SL2 based on the attribute information. As discussed above, it is possible to automatically display text data in the center in a cell whose size has been reset or to set the text data to the same font as the one used before the resetting. The cell size can be reset without correcting the attribute information of the text data to be displayed in that cell. Further, it is possible to improve the speed of the process to acquire the attribute information necessary for displaying the reset cell.

When a reset cell fully covers an adjoining cell, the value associated with that adjoining cell cannot be used in the spreadsheet processing. When a reset cell partially covers an adjoining cell, the value associated with that adjoining cell can be used in the spreadsheet processing. Further, the resetting of attribute information cell by cell is executed in the same procedures as the above-described resetting of the cell width. As the operator repeatedly selects the "relocation" and "resetting width", it is possible to reset the size of a relocated cell or relocate a cell whose size has been reset. With regard to this function, after the relocation of the cell, for example, the end point of a cell displayed at the relocation position may be set movable to allow the size of that cell to be reset by operating the input device 1.

Although only one embodiment of the present invention has been described herein, it should be apparent to those skilled in the art that the present invention may be embodied in many other specific forms without departing from the spirit or scope of the invention. Particularly, it should be understood that this invention may be embodied in the following form.

This invention may be adapted to a document preparing apparatus installed with a spreadsheet program or a spreadsheet program on Windows.

Therefore, the present example and embodiment are to be considered as illustrative and not restrictive and the invention is not to be limited to the details given herein, but may be modified within the scope of the appended claims.

What is claimed is:

1. A document preparing apparatus comprising:

a text generator generating text; and tabulation means for forming a table containing text, said table having a plurality of cells for registering text data therein, and said tabulation means includes a processing unit allowing an operator to designate a single cell in said table and to relocate said designated cell in an area of said table together with text data registered in said designated cell, wherein said relocated designated cell includes at least one boundary not colinear with row and column boundaries of said plurality of cells in said table.

2. A document preparing apparatus comprising:

a text generator generating text; and tabulation means for forming a table containing text, said table having a plurality of cells, and said tabulation means includes a processing unit allowing an operator to designate a single cell in said table and to reset a size of said designated cell, wherein said resized designated cell includes at least one boundary not colinear with row and column boundaries of said plurality of cells of said table.

3. A document preparing apparatus comprising:

a display device for displaying on a screen thereof a table having a plurality of cells arranged in a matrix form having a plurality of rows and columns;

an input device operable by an operator, for selecting or designating one of the cells displayed on the screen and for inputting a relocation position of the selected cell in order to change the position of the selected cell; and a processing unit, operatively coupled to said display device and said input device, for generating and managing information associated with the relocation of said selected cell, said information including coordinates of a new outline of the selected cell in the relocation position generated by said processing unit based on original coordinates of the cell when selected and on data of the relocation position, which defines at least one boundary for said relocated selected cell not colinear with row and column boundaries of said plurality of cells in said table, wherein said display device is controlled by said processing unit to display the new outline of the selected cell with its position changed on the screen in accordance with said information.

4. The document preparing apparatus according to claim 3, wherein said input device is operable by an operator to prepare a document containing text and to register text in individual cells of the table, and wherein when text registered by the operator is present in the selected cell, said processing unit controls said display device to display the text in the selected cell with its position changed on the screen.

5. The document preparing apparatus according to claim 3, wherein said processing unit includes a first memory for storing the text registered in a cell by the operator; and a second memory for storing attribute information associated with the text stored in said first memory, and wherein said processing unit controls said display device to display the text, stored in said first memory, in the cell whose position has been changed, with reference to the associated attribute information stored in said second memory.

6. The document preparing apparatus according to claim 4, wherein said apparatus operates in one of a text mode and a table mode, wherein in the text mode, said processing unit permits an operator to prepare texts using said input device and causes the operator-prepared text to be displayed on the screen of said display device, wherein in the table mode, said processing unit permits an operator to prepare a table using said input device and causes the operator-prepared table to be displayed on the screen of said display device, and wherein said input device is operable by an operator to select either said text mode or said table mode, whereby an operation mode of said document preparing apparatus is selectively switched between said text mode and said table mode in accordance with a mode selection made by said operator.

7. A document preparing apparatus comprising:

a display device for displaying on a screen thereof a table having a plurality of cells arranged in a matrix form having a plurality of rows and columns;

an input device operable by an operator, for selecting or designating one of the cells displayed on the screen and for inputting a relocation position of the selected cell in order to change the position of the selected cell; and a processing unit, operatively coupled to said display device and said input device, for generating and managing coordinates of a new outline of the selected cell in the relocation position based on original coordinates of the cell when selected and on data of the relocation position, which defines at least one boundary for said relocated selected cell not colinear with row and column boundaries of said plurality of cells in said table, wherein said processing unit identifies said individual cells by their row numbers and column numbers and generates and manages positional information and attribute information of each cell in association with its row and column numbers, and wherein said display device is controlled by said processing unit to display the new outline of the selected cell with its position changed on the screen in accordance with said coordinates of a new outline of the selected cell, positional information and attribute information, each associated with the selected cell.

8. A document preparing apparatus comprising:

a display device for displaying on a screen thereof a table having a plurality of cells arranged in a matrix form having a plurality number of rows and columns;

an input device operable by an operator, for selecting or designating one of the cells displayed on the screen and for inputting a new size of the selected cell in order to change the size of the selected cell; and a processing unit, operatively coupled to said display device and said input device, for generating and managing information associated with the resetting of the size of said selected cell, said information including coordinates of a new outline of the selected cell with its size changed, which are generated by said processing unit based on original coordinates of the cell when selected and on data of the new size, which defines at least one boundary for said resized selected cell not colinear with row and column boundaries of said plurality of cells of said table, wherein said display device is controlled by said processing unit to display the new outline of the selected cell on the screen in accordance with said information.

9. The document preparing apparatus according to claim 8, wherein said input device is operable by an operator to prepare a document containing text and to register text in the cells of the table;

wherein said processing unit includes a first memory for storing the text registered in a cell by the operator and a second memory for storing attribute information associated with the text stored in said first memory; and wherein when the text registered by the operator is present in the selected cell, said processing unit controls said display device to display the text, stored in said first memory, in the cell whose size has been changed, with reference to the associated attribute information stored in said second memory.

10. The document preparing apparatus according to claim 9, wherein said apparatus operates in one of a text mode and a table mode, wherein in the text mode, said processing unit permits an operator to prepare text using said input device and causes the operator-prepared text to be displayed on the screen of said display device, wherein in the table mode, said processing unit permits an operator to prepare a table using said input device and causes the operator-prepared table to be displayed on the screen of said display device, and wherein said input device is operable by an operator to select either said text mode or said table mode, whereby an operation mode of said document preparing apparatus is selectively switched between said text mode and said table mode, in accordance with a mode selection made by the operator.

11. The document preparing apparatus according to claim 8, wherein said processing unit identifies said individual cells by their row numbers and column numbers, manages positional information and attribute information of each cell in association with its row and column numbers.

12. The document preparing apparatus according to claim 8, wherein each of said cells has a predetermined vertical length and a predetermined horizontal length, wherein said input device is operable by an operator to select cells in one or more rows and to input a new vertical length of each selected cell in order to change each vertical length of the selected cells, and is also operable by the operator to select cells in one or more columns and to input a new horizontal length of each of the selected cell in order to change each horizontal length of the selected cells, wherein said processing unit includes a memory containing four storage sections: a first storage section for storing data of standard vertical and horizontal lengths of each cell; a second storage section for storing data of the new vertical length for each of the selected cells; a third storage section for storing data of the new horizontal length for each of the selected cells; and a fourth storage section for storing data of either a new vertical length or a new horizontal length for a cell located on a specific row and a specific column, and wherein said processing unit receives data of the vertical and horizontal lengths of a selected cell from said fourth storage section, said third storage section, said second storage section and said first storage section, in this order, so as to control the display of cells on said display device.

13. The document preparing apparatus according to claim 12, wherein the memory of said processing unit further includes a fifth storage section for storing three flags: a first flag indicating whether a new vertical length for each selected cell has been input; a second flag indicating whether a new horizontal length for each selected cell has been input; and a third flag indicating whether one of a new vertical length or a new horizontal length for the cell located on the specific row and the specific column has been input, wherein said processing unit includes means for checking said third flag, followed by checking one of said first and second flags, in order to determine whether one of the vertical length and the horizontal length of a cell is newly set, and wherein said processing unit receives data of one of the new vertical and horizontal lengths from said fourth storage section when said third flag is set positive;

wherein said processing unit receives data of the new vertical length from said second storage section when said first flag is set positive;

wherein said processing unit receives data of the new horizontal length from said third storage section when said second flag is set positive; and wherein said processing unit receives data of the standard vertical and horizontal lengths from said first storage section when none of said first to third flags is set positive.

14. A computer program product for use in preparing document comprising:

a computer usable medium having computer readable program code means embodied therein for causing a computer system, which includes a display device displaying on a screen thereof a table having a plurality of cells and an operator operable input device, A) to identify selected or designated one of the cells by using said input device;

B) to identify an inputted relocation position of the selected cell by using said input device;

C) to generate and manage information associated with the relocation of said selected cell, said information including coordinates of a new outline of the selected cell in the relocation position, which are generated by said computer system based on original coordinates of the cell when selected and on data of the relocation position, which defines at least one boundary for said relocated selected cell not colinear with row and column boundaries of said plurality of cells in said table; and D) to display the new outline of the selected cell with its position changed on the screen of said display device in accordance with said information.

15. A computer program product for use in preparing document comprising:

a computer usable medium having computer readable program code means embodied therein for causing a computer system, which includes a display device displaying on a screen thereof a table having a plurality of cells and an operator operable input device, A) to identify selected or designated one of the cells by using said input device;

B) to identify an inputted new size of the selected cell by using said input device;

C) to generate and manage information associated with the resetting of the size of said selected cell, said information including coordinates of a new outline of the selected cell with its size changed, which are generated by said computer system based on original coordinates of the cell when selected and on data of the new size, which defines at least one boundary for said resized selected cell not colinear with row and column boundaries of said plurality of cells of said table; and D) to display the new outline of the selected cell on the screen of said display device in accordance with said information.

* * * * *